(12) United States Patent
Unagami et al.

(10) Patent No.: US 12,275,323 B2
(45) Date of Patent: Apr. 15, 2025

(54) CHARGING STATION, BATTERY MANAGEMENT SYSTEM, AND CHARGING METHOD THAT FORGO CHARGING WHEN A DEGREE OF DETERIORATION IS ADVANCED

(71) Applicant: Panasonic Intellectual Property Corporation of America, Torrance, CA (US)

(72) Inventors: Yuji Unagami, Osaka (JP); Toshihiro Inokuchi, Osaka (JP); Motoji Ohmori, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 564 days.

(21) Appl. No.: 17/523,610

(22) Filed: Nov. 10, 2021

(65) Prior Publication Data
US 2022/0063435 A1    Mar. 3, 2022

Related U.S. Application Data

(63) Continuation of application No. PCT/JP2020/036970, filed on Sep. 29, 2020.

(30) Foreign Application Priority Data

Oct. 4, 2019   (JP) .................. 2019-183441

(51) Int. Cl.
*H01M 10/46*    (2006.01)
*B60L 50/60*    (2019.01)
(Continued)

(52) U.S. Cl.
CPC ............... *B60L 53/62* (2019.02); *B60L 50/60* (2019.02); *B60L 53/65* (2019.02); *B60L 53/66* (2019.02);
(Continued)

(58) Field of Classification Search
CPC .... H02J 7/00712; H02J 7/005; H02J 7/00045; B60L 50/60; B60L 53/66; B60L 53/65;
(Continued)

(56) References Cited

U.S. PATENT DOCUMENTS 9,288,063 B2    3/2016    Unagami et al.
9,651,406 B2    5/2017    Unagami et al.
(Continued)

FOREIGN PATENT DOCUMENTS

EP    3416262 A1 *   12/2018   ............. G06Q 50/06
JP    2006-019194    1/2006
(Continued)

OTHER PUBLICATIONS

International Search Report (ISR) from International Searching Authority (Japan Patent Office) in International Pat. Appl. No. PCT/JP2020/036970, dated Dec. 8, 2020, together with an English language translation.

(Continued)

*Primary Examiner* — Edward Tso
(74) *Attorney, Agent, or Firm* — Greenblum and Bernstein, P.L.C.

(57) ABSTRACT

A charging station charges an electric energy storage device, and includes: a battery authenticator that performs mutual authentication with the electric energy storage device connected for charging; a communicator that obtains, from the electric energy storage device whose validity is confirmed in the mutual authentication, a degree of deterioration related to deterioration of the electric energy storage device; a recorder that stores the degree of deterioration obtained by the communicator and that is tamper-resistant; and a controller that does not charge the electric energy storage device when the degree of deterioration of the electric energy (Continued)

storage device indicates that the deterioration is advanced beyond a predetermined threshold value.

11 Claims, 7 Drawing Sheets

(51) Int. Cl.
  *B60L 53/62* (2019.01)
  *B60L 53/65* (2019.01)
  *B60L 53/66* (2019.01)
  *B60L 58/16* (2019.01)
  *H02J 7/00* (2006.01)
(52) U.S. Cl.
  CPC .......... *B60L 58/16* (2019.02); *H02J 7/00045* (2020.01); *H02J 7/005* (2020.01); *H02J 7/00712* (2020.01)
(58) Field of Classification Search
  CPC .... B60L 53/62; B60L 53/30; H01M 2310/48; H01M 10/44; H01M 10/46
  USPC ........ 320/104, 107, 109, 114, 115, 132, 149
  See application file for complete search history.

(56) References Cited

U.S. PATENT DOCUMENTS

| 2012/0050054 | A1 | 3/2012 | Fujiwara |
| 2014/0059350 | A1 | 2/2014 | Unagami et al. |
| 2020/0044462 | A1 | 2/2020 | Sasaki |
| 2021/0004879 | A1 | 1/2021 | Nakajima et al. |
| 2022/0305943 | A1* | 9/2022 | Jung ....................... B60L 53/66 |

FOREIGN PATENT DOCUMENTS

| KR | 101653700 | 9/2016 |
| WO | 2013/108318 | 7/2013 |
| WO | 2013/171833 | 11/2013 |
| WO | 2018/155270 | 8/2018 |
| WO | 2019/181628 | 9/2019 |
| WO | WO-2023051993 A1 * | 4/2023 |

OTHER PUBLICATIONS

Extended European Search Report (EESR) from European Patent Office (EPO) in European Patent Appl. No. 20871070.7, dated Nov. 22, 2022.

Hearing Notice from Intellectual Property India in Indian Pat. Appl. No. 202147051648, dated Nov. 20, 2024.

* cited by examiner

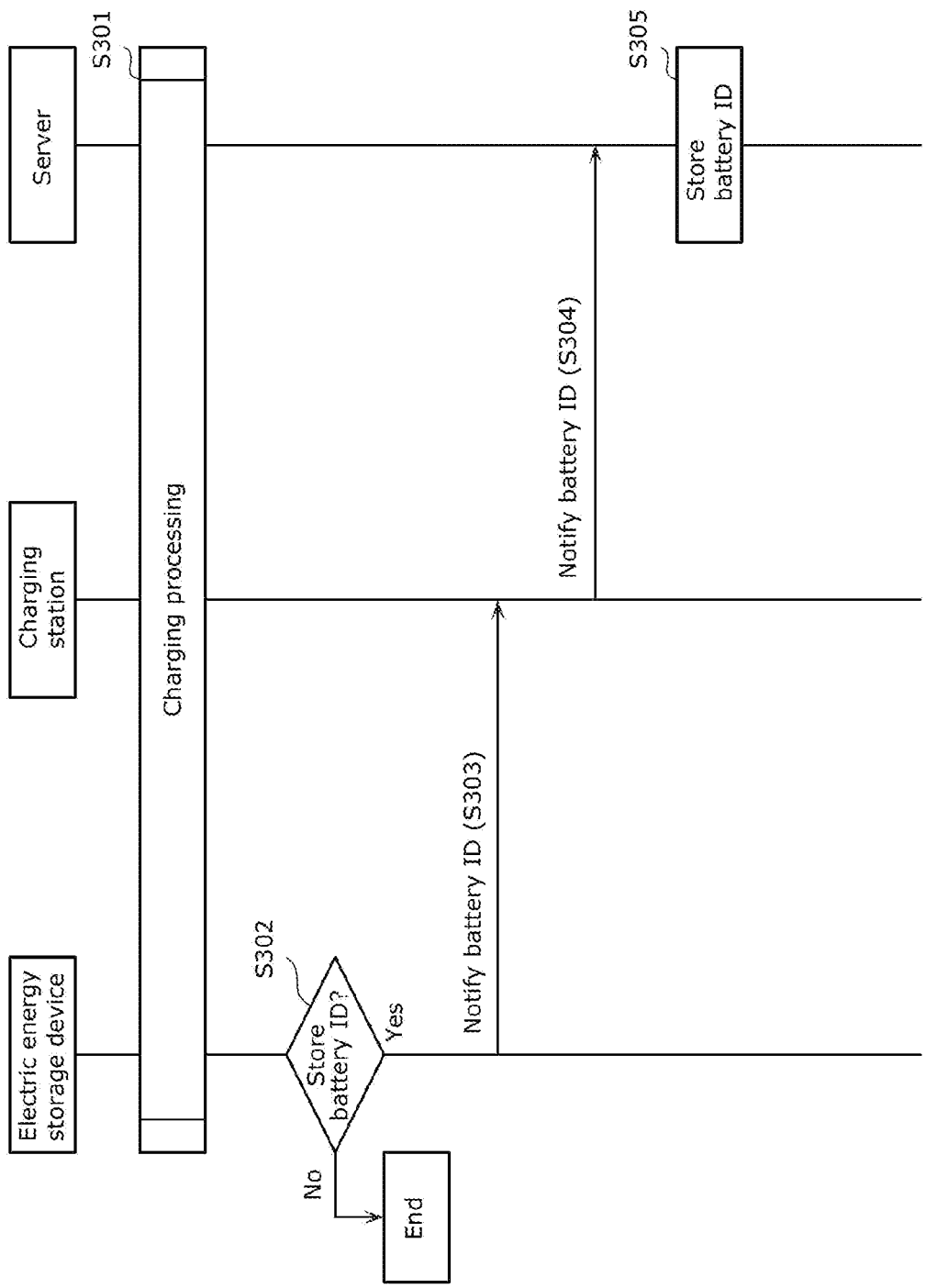

CHARGING STATION, BATTERY MANAGEMENT SYSTEM, AND CHARGING METHOD THAT FORGO CHARGING WHEN A DEGREE OF DETERIORATION IS ADVANCED

CROSS-REFERENCE TO RELATED APPLICATIONS

This is a continuation application of PCT International Application No. PCT/JP2020/036970 filed on Sep. 29, 2020, designating the United States of America, which is based on and claims priority of Japanese Patent Application No. 2019-183441 filed on Oct. 4, 2019. The entire disclosures of the above-identified applications, including the specifications, drawings and claims are incorporated herein by reference in their entirety.

FIELD

The present disclosure relates to a charging station, a battery management system, and a charging method that detect unauthorized use and deterioration of an electric energy storage device incorporated in an electric vehicle.

BACKGROUND

Patent Literature (PTL) 1 discloses a method for detecting an unauthorized electric energy storage device into which an authorized encryption module is introduced in an unauthorized manner.

CITATION LIST

Patent Literature

PTL 1: International Publication No. 2013/108318

SUMMARY

Technical Problem

Disadvantageously, in the method as disclosed in Patent Literature (PTL) 1, the amount of power available in the electric energy storage device cannot be kept equal to or greater than a given amount.

Solution to Problem

In order to achieve the above object, a charging station according to an aspect of the present disclosure charges an electric energy storage device, and includes: an authenticator that performs mutual authentication with the electric energy storage device connected for charging; an obtainer that obtains, from the electric energy storage device whose validity is confirmed in the mutual authentication, a degree of deterioration related to deterioration of the electric energy storage device; a memory that stores the degree of deterioration obtained by the obtainer and that is tamper-resistant; and a controller that does not charge the electric energy storage device when the degree of deterioration of the electric energy storage device stored in the memory indicates that the deterioration is advanced beyond a predetermined threshold value.

A battery management system according to an aspect of the present disclosure includes an electric energy storage device and a charging station, the electric energy storage device includes: a first authenticator that performs mutual authentication with the charging station connected for charging; a first memory that stores a degree of deterioration related to deterioration of the electric energy storage device and that is tamper-resistant; and a transmitter that transmits the degree of deterioration stored in the first memory to the charging station, and the charging station includes: a second authenticator that performs mutual authentication with the electric energy storage device connected for charging; a second obtainer that obtains, from the electric energy storage device whose validity is confirmed in the mutual authentication, a degree of deterioration related to deterioration of the electric energy storage device; a second memory that stores the degree of deterioration obtained by the second obtainer and that is tamper-resistant; and a controller that does not charge the electric energy storage device when the degree of deterioration of the electric energy storage device stored in the second memory indicates that the deterioration is advanced beyond a predetermined threshold value.

A charging method according to an aspect of the present disclosure is a charging method performed by a charging station that charges an electric energy storage device, and includes: performing mutual authentication with the electric energy storage device connected to the charging station for charging; obtaining, from the electric energy storage device whose validity is confirmed in the mutual authentication, a degree of deterioration related to deterioration of the electric energy storage device; storing the degree of deterioration obtained in a memory that is included in the charging station and that is tamper-resistant; and forgoing charging the electric energy storage device when the degree of deterioration of the electric energy storage device indicates that the deterioration is advanced beyond a predetermined threshold value.

Advantageous Effects

According to the present disclosure, the amount of power available in an electric energy storage device can be kept equal to or greater than a given amount.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 9 is a sequence diagram illustrating an example of notification processing of a battery ID in the embodiment.

Figure 1:
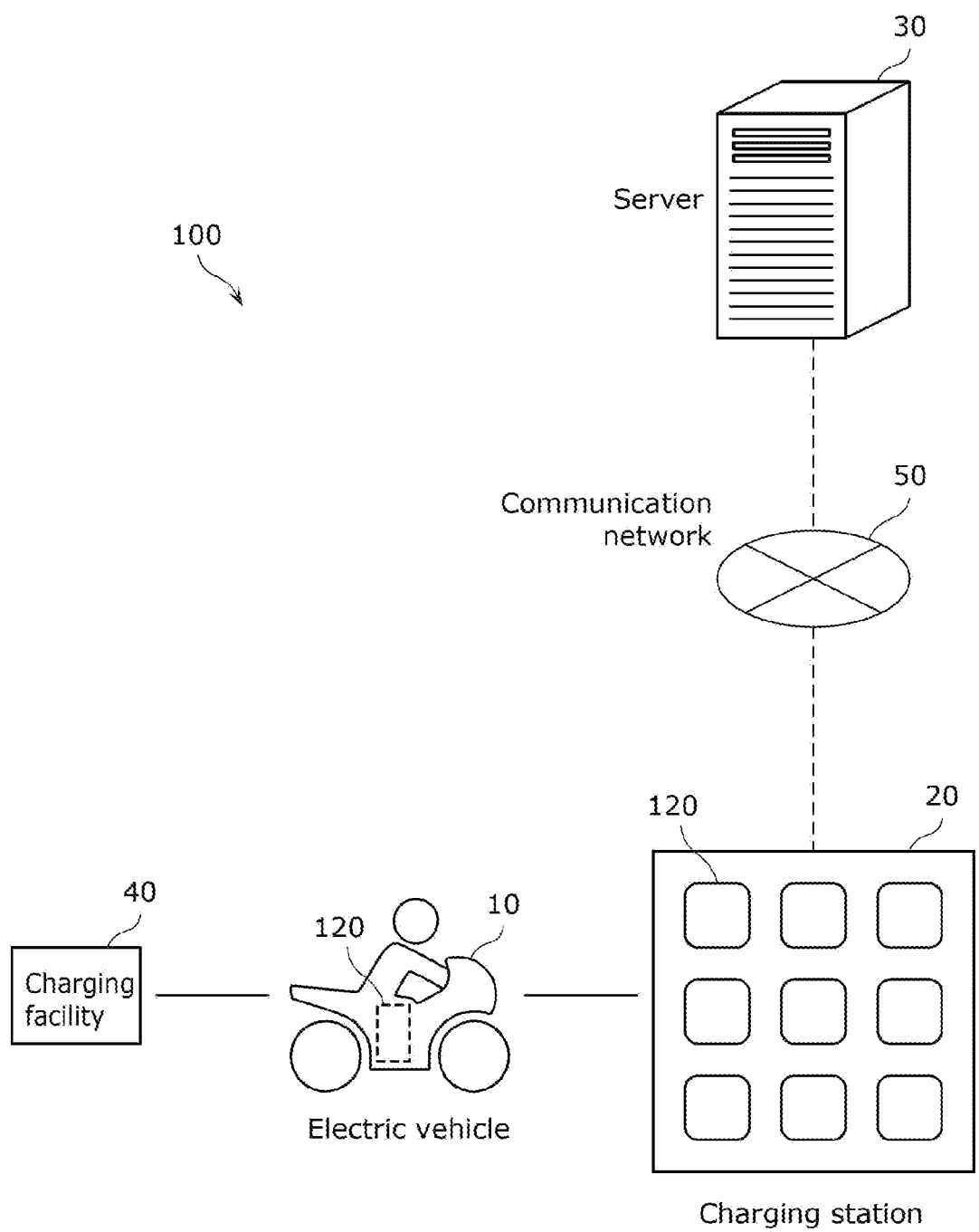
FIG. 1 is a diagram illustrating an example of the overall configuration of a battery management system according to an embodiment.

DESCRIPTION OF EMBODIMENTS (Underlying Knowledge Forming Basis of the Present Disclosure)

In recent years, the utilization of electric vehicles such as electric automobiles and electric motorbikes has been started. As the power supply of an electric vehicle, a replaceable electric energy storage device having a secondary battery is used, and a service for replacing electric energy storage devices is known. In this service, a plurality of electric energy storage devices are simultaneously charged in a charging station, and then the charged electric energy storage devices are provided to users as necessary. In the charging station, the user replaces an electric energy storage device having a small remaining amount in a battery with another charged electric energy storage device. In this way, the user only replaces the electric energy storage device without considering the charging time of the electric energy storage device to be able to continue the travel of the electric vehicle, with the result that an extension of the distance travelled and the like can be expected.

Electric energy storage devices common to makers of electric vehicles are used, and thus it can be expected that the economies of scale are achieved by arranging the charging stations of a plurality of makers in various places.

On the other hand, when in the service for replacing electric energy storage devices, an unauthorized electric energy storage device is used in a mixed manner, it is assumed that an electric vehicle does not operate properly or a fire caused by an electric energy storage device occurs in the worst case. Patent Literature (PTL) 1 discloses a method for detecting an unauthorized battery by using charge/discharge information in which identification information for identifying an encryption key used in mutual authentication between a charge/discharge device performing charging or discharging and an electric energy storage device connected to the charge/discharge device is associated with connection information on the charge/discharge device obtained when the electric energy storage device is connected to the charge/discharge device and thereby determining whether or not a plurality of pieces of connection information corresponding to the same identification information are present.

However, even in an authorized electric energy storage device that satisfies criteria, depending on the conditions of use or the like, a secondary battery included in the electric energy storage device deteriorates (in the following description, the deterioration of a secondary battery included in an electric energy storage device is simply referred to as the deterioration of the electric energy storage device). Here, when the history of use including the conditions of use of the electric energy storage device and the like is tampered, the deterioration of the electric energy storage device cannot be detected. Hence, in the service for replacing electric energy storage devices, a large number of deteriorated electric energy storage devices are distributed.

When a large number of deteriorated electric energy storage devices are utilized, if an electric energy storage device is replaced with a charged electric energy storage device that has deteriorated, a distance over which an electric vehicle can travel is shortened, with the result that the frequency of replacement is increased.

As described above, the tampering of the history of use of the electric energy storage device and the distribution of a large number of deteriorated electric energy storage devices lead to a reduction in the amount of power available in the electric energy storage device. Hence, in order to keep the amount of power available in the electric energy storage device equal to or greater than a given amount, it is necessary to provide both a mechanism for preventing the history of use of the electric energy storage device from being tampered and a mechanism for suppressing the distribution of deteriorated electric energy storage devices.

A charging station according to an aspect of the present disclosure charges an electric energy storage device, and includes: an authenticator that performs mutual authentication with the electric energy storage device connected for charging; an obtainer that obtains, from the electric energy storage device whose validity is confirmed in the mutual authentication, a degree of deterioration related to deterioration of the electric energy storage device; a memory that stores the degree of deterioration obtained by the obtainer and that is tamper-resistant; and a controller that does not charge the electric energy storage device when the degree of deterioration of the electric energy storage device stored in the memory indicates that the deterioration is advanced beyond a predetermined threshold value.

Hence, the charging station obtains, from the electric energy storage device whose validity is confirmed by performing the mutual authentication, the degree of deterioration of the electric energy storage device, and does not charge the electric energy storage device when the degree of deterioration indicates that the deterioration is advanced beyond the predetermined threshold value. Therefore, it is possible to suppress the utilization and distribution of deteriorated electric energy storage devices. In this way, the amount of power available in the electric energy storage device can be kept equal to or greater than a given amount.

The controller may charge the electric energy storage device when the degree of deterioration of the electric energy storage device does not indicate that the deterioration is advanced beyond the predetermined threshold value.

Hence, it is possible to charge the electric energy storage device in which its deterioration is not advanced without charging the deteriorated electric energy storage device.

The degree of deterioration may be at least one of a charge count, a charge amount, or a state of health (SOH).

Hence, it is possible to determine the degree of deterioration of the electric energy storage device according to the charge count, the charge amount, and the state of health (SOH).

The obtainer may further obtain an identifier of the electric energy storage device, and the controller may transmit the identifier of the electric energy storage device to a management device when the degree of deterioration of the electric energy storage device indicates that the deterioration is advanced beyond the predetermined threshold value.

Hence, it is possible to easily distinguish deteriorated electric energy storage devices.

The obtainer may further obtain an identifier of the electric energy storage device, and the controller may transmit, to a management device, the identifier of the electric energy storage device whose validity is not confirmed in the mutual authentication.

Hence, it is possible to easily distinguish unauthorized electric energy storage devices.

The degree of deterioration may be a charge count, and when the electric energy storage device is charged, the controller may increment a charge count of the electric energy storage device stored in the memory by one to obtain a new charge count, and transmit the new charge count to a management device.

Hence, it is possible to appropriately manage the charge count of the electric energy storage device.

A battery management system according to an aspect of the present disclosure includes: an electric energy storage device; and a charging station, the electric energy storage device includes: a first authenticator that performs mutual authentication with the charging station connected for charging; a first memory that stores a degree of deterioration related to deterioration of the electric energy storage device and that is tamper-resistant; and a transmitter that transmits the degree of deterioration stored in the first memory to the charging station, and the charging station includes: a second authenticator that performs mutual authentication with the electric energy storage device connected for charging; a second obtainer that obtains, from the electric energy storage device whose validity is confirmed in the mutual authentication, a degree of deterioration related to deterioration of the electric energy storage device; a second memory that stores the degree of deterioration obtained by the second obtainer and that is tamper-resistant; and a controller that does not charge the electric energy storage device when the degree of deterioration of the electric energy storage device stored in the second memory indicates that the deterioration is advanced beyond a predetermined threshold value.

Hence, even when an electric vehicle cannot perform communication, the battery ID of another electric energy storage device can be transmitted through an authorized electric energy storage device to the charging station.

The first authenticator may further perform mutual authentication with an electric vehicle to which the electric energy storage device is connected, the electric energy storage device may further include a first obtainer that obtains, from the electric vehicle, an identifier of another electric energy storage device different from the electric energy storage device, the first memory may store the identifier of the another electric energy storage device obtained from the first obtainer, and the transmitter may transmit the identifier of the another electric energy storage device stored in the first memory to the charging station connected for the charging.

Hence, the charging station obtains, from the electric energy storage device whose validity is confirmed by performing the mutual authentication, the degree of deterioration of the electric energy storage device, and does not charge the electric energy storage device when the degree of deterioration indicates that the deterioration is advanced beyond the predetermined threshold value. Therefore, it is possible to suppress the utilization and distribution of deteriorated electric energy storage devices. In this way, the amount of power available in the electric energy storage device can be kept equal to or greater than a given amount.

A charging method according to an aspect of the present disclosure is a charging method performed by a charging station that charges an electric energy storage device, and includes: performing mutual authentication with the electric energy storage device connected to the charging station for charging; obtaining, from the electric energy storage device whose validity is confirmed in the mutual authentication, a degree of deterioration related to deterioration of the electric energy storage device; storing the degree of deterioration obtained in a memory that is included in the charging station and that is tamper-resistant; and forgoing charging the electric energy storage device when the degree of deterioration of the electric energy storage device indicates that the deterioration is advanced beyond a predetermined threshold value.

Hence, the charging station obtains, from the electric energy storage device whose validity is confirmed by performing the mutual authentication, the degree of deterioration of the electric energy storage device stored in the tamper-resistant first memory, and does not charge the electric energy storage device when the degree of deterioration indicates that the deterioration is advanced beyond the predetermined threshold value. Thus, by using the degree of deterioration that is not tampered, it is possible to appropriately determine whether or not the electric energy storage device is charged. Therefore, it is possible to suppress the utilization and distribution of deteriorated electric energy storage devices. In this way, the amount of power available in the electric energy storage device can be kept equal to or greater than a given amount.

A battery management system according to an embodiment of the present disclosure will be described below with reference to drawings. In the embodiment described below, preferred specific examples of the present disclosure will be shown. In other words, values, shapes, materials, constituent elements, the arrangement and connection form of the constituent elements, steps, the order of the steps, and the like that are shown in the embodiment described below are examples of the present disclosure and are not intended to limit the present disclosure. The present disclosure is specified based on the scope of claims. Hence, although among the constituent elements in the embodiment below, constituent elements that are not recited in independent claims showing the top-level concept of the present disclosure are not necessarily needed in order to achieve the object of the present disclosure, they will be described as constituent elements that form more preferred aspects.

(Embodiment)

[1. System Configuration]

Here, as the embodiment of the present disclosure, examples will be described with reference to drawings.

[1.1 Overall Configuration of Battery Management System]

FIG. 1 is a diagram illustrating an example of the overall configuration of the battery management system according to the embodiment. Battery management system 100 includes electric energy storage devices 120, electric vehicle 10 operated by the power of electric energy storage device 120, and charging station 20 that charges electric energy storage devices 120. Battery management system 100 may further include server 30, charging facility 40, and communication network 50. Charging station 20 and server 30 are connected through communication network 50 to be able to communicate with each other.

Communication network 50 may be a general-purpose network such as the Internet or may be a dedicated network. Communication network 50 may include, for example, a mobile communication system such as a third generation mobile communication system (3G), a fourth generation mobile communication system (4G), a fifth generation mobile communication system (5G), or LTE (registered trademark).

[1.2 Configuration of Electric Vehicle]

Figure 2:
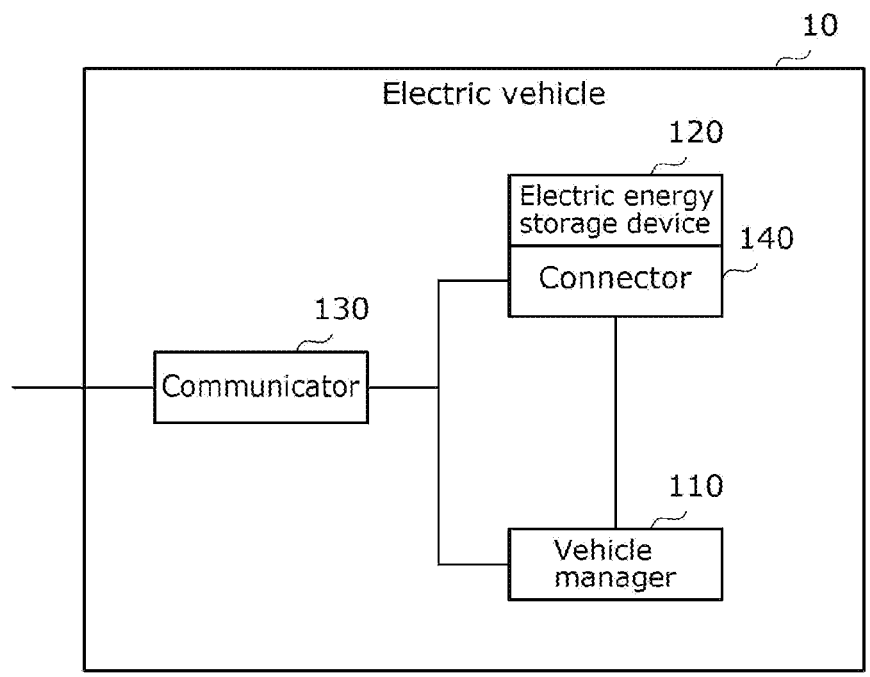
FIG. 2 is a block diagram illustrating an example of the overall configuration of an electric vehicle in the embodiment.

FIG. 2 is a block diagram illustrating an example of the overall configuration of the electric vehicle in the embodiment.

Electric vehicle 10 includes vehicle manager 110, communicator 130, and connector 140.

Vehicle manager 110 is a processor that performs control on the operation of electric vehicle 10. A specific configuration of vehicle manager 110 will be described later with reference to FIG. 3. Vehicle manager 110 is realized by, for example, a control circuit including a processor and a memory.

Communicator 130 may be connected through communication network 50 to server 30 to be able to communicate with server 30 or may be connected through communication network 50 to another device to be able to communicate with the device. Communicator 130 may be directly connected to another device to be able to communicate with the device. A communication interface that realizes communicator 130 may be a communication interface that can be connected to communication network 50 to communicate with communication network 50. Specifically, the communication interface is a communication interface that is connected to communication network 50 to communicate with communication network 50 by communication connection with a base station in a mobile communication system. The communication interface may be, for example, a wireless communication interface in conformance with communication standards utilized in a mobile communication system such as a third generation mobile communication system (3G), a fourth generation mobile communication system (4G), a fifth generation mobile communication system (5G), or LTE (registered trademark). The communication interface may be, for example, a wireless LAN (Local Area Network) interface in conformance with IEEE802.11a, b, g, n, ac standards or may be a communication interface that is connected to communication network 50 to communicate with communication network 50 by communication connection with an unillustrated router (for example, a mobile wireless LAN router). The communication interface that realizes communicator 130 may be included in a control circuit that realizes vehicle manager 110.

Connector 140 is connected to electric energy storage device 120 to receive the supply of power from electric energy storage device 120. The power from electric energy storage device 120 is supplied to an actuator (for example, a motor) that generates the motive power of electric vehicle 10, the control circuit that realizes vehicle manager 110, the communication interface that realizes communicator 130, and the like. Connector 140 receives, from electric energy storage device 120, battery information that is information of electric energy storage device 120. Connector 140 includes a power receiving terminal (unillustrated) that is connected to the power terminal of electric energy storage device 120 to receive the supply of the power from electric energy storage device 120 and a communication terminal (unillustrated) that is connected to the communication terminal of electric energy storage device 120 to receive, from electric energy storage device 120, the battery information that is information of electric energy storage device 120.

[1.2.1 Configuration of Vehicle Manager]

Figure 3:
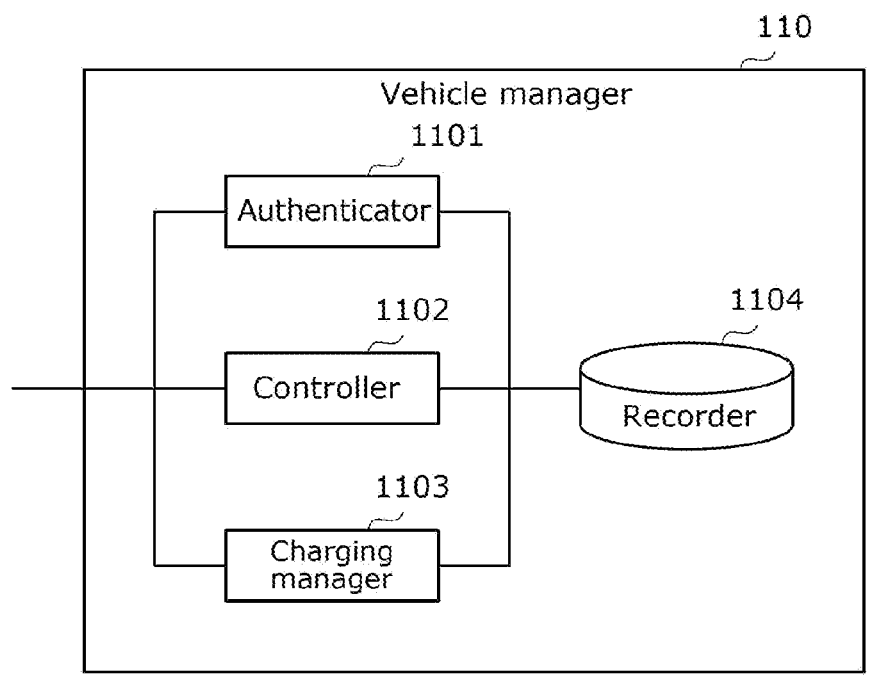
FIG. 3 is a block diagram illustrating an example of the configuration of a vehicle manager in the embodiment.

FIG. 3 is a block diagram illustrating an example of the configuration of the vehicle manager in the embodiment.

Vehicle manager 110 includes authenticator 1101, controller 1102, charging manager 1103, and recorder 1104.

Authenticator 1101 authenticates electric energy storage device 120 connected to connector 140. Authenticator 1101 includes a security chip that holds an encryption key or a certificate used for the authentication. The security chip is tamper-resistant for preventing the encryption key or the certificate held from being tampered or leaking.

Authenticator 1101 does not need to include the security chip that holds the encryption key or the certificate. When authenticator 1101 does not include the security chip, for example, vehicle manager 110 may include the security chip. Authenticator 1101 that does not include the security chip holds an encryption key or a certificate that is encrypted. Authenticator 1101 may decode the encryption key or the certificate that is encrypted within the security chip of vehicle manager 110 so as to perform the authentication with the encryption key or the certificate that is decoded.

When authenticator 1101 authenticates electric energy storage device 120 to find that electric energy storage device 120 connected to connector 140 is unauthorized, authenticator 1101 outputs the ID (hereinafter referred to as the battery ID) of unauthorized electric energy storage device 120 to recorder 1104. The battery ID is an example of an identifier for identifying electric energy storage device 120. When electric vehicle 10 is connected with the network to server 30, authenticator 1101 notifies server 30 of the unauthorized battery ID of unauthorized electric energy storage device 120 connected to connector 140. Authenticator 1101 may use, for example, TLS (Transport Layer Security) to perform mutual authentication with electric energy storage device 120.

Controller 1102 controls the operation of electric vehicle 10. Controller 1102 controls, according to an operation performed by the user of electric vehicle 10, the operation of the actuator that generates the motive power of electric vehicle 10. For example, controller 1102 controls, according to the operation of the user, an operation related to the travel of electric vehicle 10.

Charging manager 1103 performs charging control on electric energy storage device 120 connected to connector 140. When electric vehicle 10 is connected to a power supply, charging manager 1103 charges electric energy storage device 120 connected to connector 140 of electric vehicle 10 by power from the power supply. The power supply may be, for example, charging facility 40 or an outlet in the home.

Recorder 1104 manages the unauthorized battery ID of unauthorized electric energy storage device 120. Recorder 1104 stores the unauthorized battery ID of unauthorized electric energy storage device 120, and each time unauthorized electric energy storage device 120 is connected to connector 140, recorder 1104 stores the unauthorized battery ID of unauthorized electric energy storage device 120 connected to connector 140, with the result that recorder 1104 manages the unauthorized battery ID of unauthorized electric energy storage device 120. Recorder 1104 may store the unauthorized battery ID and a date and time when unauthorized electric energy storage device 120 having the unauthorized battery ID is connected to connector 140 such that the unauthorized battery ID and the date and time are associated with each other. Recorder 1104 may be a tamper-resistant security chip (memory).

As described above, in vehicle manager 110, authenticator 1101 and recorder 1104 perform processing for managing the battery ID on unauthorized electric energy storage device 120. Authenticator 1101 and recorder 1104 may perform not only the processing for managing the battery ID of unauthorized electric energy storage device 120 but also processing for managing the battery ID of authorized electric energy storage device 120.

In a case where the battery ID of authorized electric energy storage device 120 is also managed, when authorized electric energy storage device 120 is connected to connector 140, authenticator 1101 outputs the authorized battery ID of authorized electric energy storage device 120 to recorder

1104. When electric vehicle 10 is connected with the network to server 30, authenticator 1101 notifies server 30 of the authorized battery ID of authorized electric energy storage device 120 connected to connector 140. In order to distinguish between the battery ID of unauthorized electric energy storage device 120 and the battery ID of authorized electric energy storage device 120, authenticator 1101 further outputs identifiers for indicating whether electric energy storage device 120 is unauthorized or authorized such that the identifiers are respectively associated with the battery IDs.

Recorder 1104 further manages the battery ID of authorized electric energy storage device 120. In other words, recorder 1104 manages the battery ID of unauthorized electric energy storage device 120 and the battery ID of authorized electric energy storage device 120. Regardless of whether electric energy storage device 120 is unauthorized, recorder 1104 stores the battery IDs of all electric energy storage devices 120 connected to connector 140, and each time electric energy storage device 120 is connected to connector 140, recorder 1104 stores the battery ID of electric energy storage device 120 connected to connector 140. In order to distinguish between the battery ID of unauthorized electric energy storage device 120 and the battery ID of authorized electric energy storage device 120, recorder 1104 further stores identifiers for indicating whether electric energy storage device 120 is unauthorized or authorized. In this way, recorder 1104 manages the battery ID of unauthorized electric energy storage device 120 and the battery ID of authorized electric energy storage device 120.

[1.2.2 Configuration of Electric Energy Storage Device]

Figure 4:
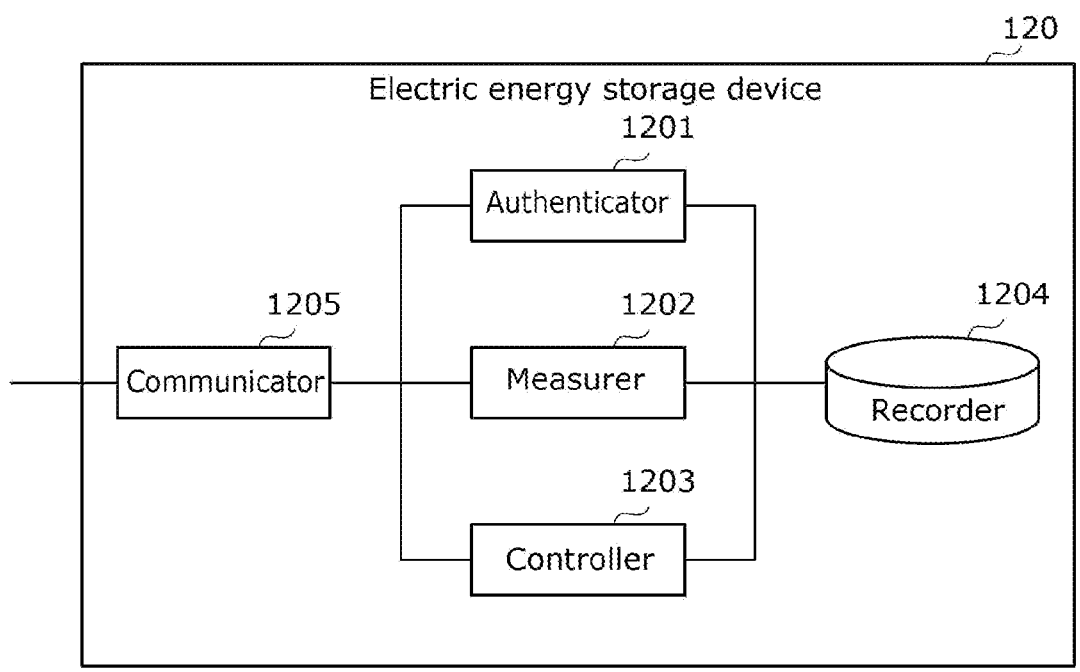
FIG. 4 is a block diagram illustrating an example of the configuration of an electric energy storage device in the embodiment.

FIG. 4 is a block diagram illustrating an example of the configuration of the electric energy storage device in the embodiment.

Electric energy storage device 120 includes authenticator 1201, measurer 1202, controller 1203, recorder 1204, and communicator 1205.

Authenticator 1201 authenticates vehicle manager 110 connected for the supply of power stored in electric energy storage device 120 or charging station 20 connected for the charging of electric energy storage device 120. Authenticator 1201 includes a security chip that holds an encryption key or a certificate used for the authentication. The security chip is tamper-resistant for preventing the encryption key or the certificate held from being tampered or leaking.

Authenticator 1201 does not need to include the security chip that holds the encryption key or the certificate. When authenticator 1201 does not include the security chip, for example, electric energy storage device 120 may include the security chip. Authenticator 1201 that does not include the security chip holds an encryption key or a certificate that is encrypted. Authenticator 1201 may decode the encryption key or the certificate that is encrypted within the security chip of electric energy storage device 120 so as to perform the authentication with the encryption key or the certificate that is decoded.

When authenticator 1201 authenticates electric vehicle 10 or charging station 20 each time electric vehicle 10 or charging station 20 is connected to find that electric vehicle 10 connected is unauthorized or that charging station 20 connected is unauthorized, authenticator 1201 records, in recorder 1204, the ID (hereinafter referred to as the vehicle ID) of unauthorized electric vehicle 10 or the ID (hereinafter referred to as the station ID) of unauthorized charging station 20. Authenticator 1201 may use, for example, TLS to perform mutual authentication with electric vehicle 10 or charging station 20.

Measurer 1202 measures the degree of deterioration on deterioration of electric energy storage device 120. Measurer 1202 may measure the degree of deterioration at regular intervals or may measure the degree of deterioration each time electric vehicle 10 or charging station 20 is connected. The degree of deterioration is, for example, at least one of the number of times electric energy storage device 120 is charged (charge count), the amount of charging of electric energy storage device 120 (charge amount), or the state of health (SOH) of electric energy storage device 120. The charge amount of electric energy storage device 120 may be the charge amount in each round of charging or the cumulative charge amount. As the charge count and the charge amount are increased, they indicate that the degree of deterioration is further advanced. A smaller number for the SOH indicates that the degree of deterioration is further advanced.

Controller 1203 controls the charge/discharge of electric energy storage device 120.

Recorder 1204 stores the degree of deterioration measured with measurer 1202. Recorder 1204 may store the degree of deterioration and a date and time when the degree of deterioration is measured such that the degree of deterioration and the date and time are associated with each other. Recorder 1204 may include a tamper-resistant security chip (memory) such that the degree of deterioration stored cannot be tampered.

Communicator 1205 is connected to connector 140 of electric vehicle 10 to be able to communicate with electric vehicle 10. Likewise, communicator 1205 is connected to charging station 20 for charging to be able to communicate with charging station 20.

[1.3 Configuration of Charging Station]

Figure 5:
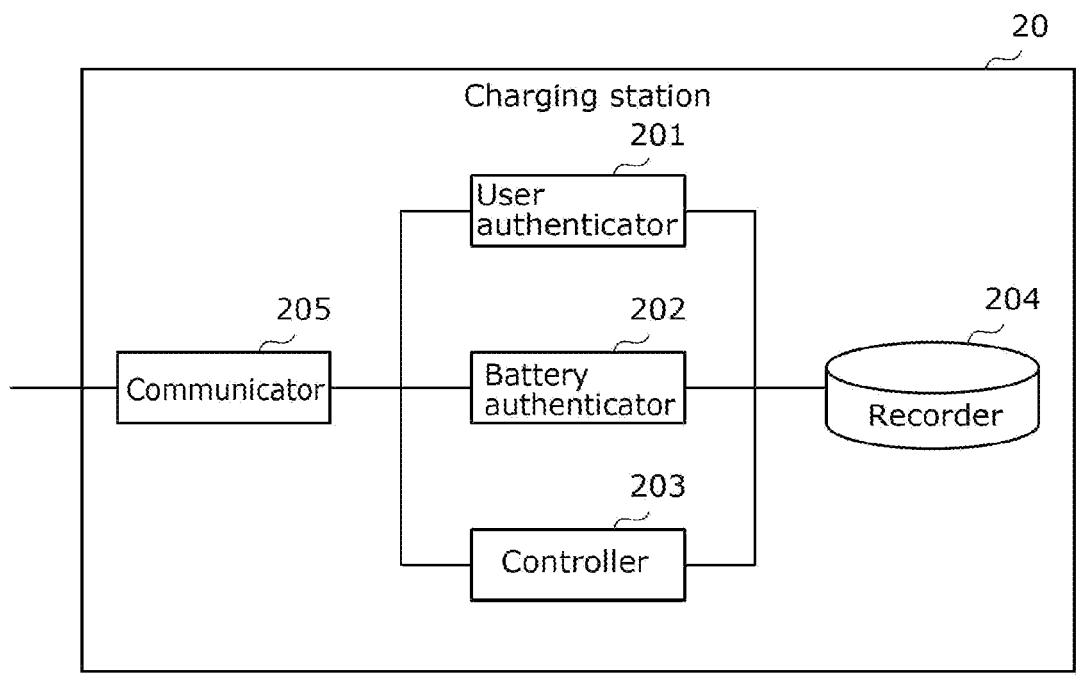
FIG. 5 is a block diagram illustrating an example of the configuration of a charging station according to the embodiment.

FIG. 5 is a block diagram illustrating an example of the configuration of the charging station according to the embodiment.

Charging station 20 includes user authenticator 201, battery authenticator 202, controller 203, recorder 204, and communicator 205.

User authenticator 201 authenticates a user who utilizes charging station 20. User authenticator 201 may perform password-authentication using the ID and password of the user by obtaining the ID and password of the user from an unillustrated input interface. In the password-authentication, user authenticator 201 checks the ID and password of the user that are previously registered against the ID and password of the user that are obtained from the input interface, and thereby authenticates the user. The ID and password of the user that are previously registered are an example of user information.

User authenticator 201 may perform authentication using a membership card owned by the user. In the authentication using the membership card, user authenticator 201 checks information of the membership card that is previously registered against information of the membership card that is read with the input interface, and thereby authenticates the user. The information of the membership card that is previously registered is an example of user information.

User authenticator 201 may perform biometric authentication on the user. In the biometric authentication, for example, face authentication or iris authentication using an input interface such as a camera may be performed. In the biometric authentication, user authenticator 201 checks biometric information of the user that is previously registered against biometric information of the user that is read with the input interface, and thereby performing user authentication.

The biometric information of the user that is previously registered is an example of user information.

Instead of the authentication method described above, user authenticator 201 may use a conventional authentication method. User authenticator 201 may obtain, from server 30, user information that is used to authenticate the user and that is previously registered. User authenticator 201 may transmit, to server 30, user information obtained from the input interface at the time of authentication and obtain the result of authentication processing performed in server 30.

Battery authenticator 202 authenticates electric energy storage device 120 that is stored in charging station 20 and that is connected for charging. Battery authenticator 202 includes a security chip that holds an encryption key or a certificate used for the authentication. The security chip is tamper-resistant for preventing the encryption key or the certificate held from being tampered or leaking.

Battery authenticator 202 does not need to include the security chip that holds the encryption key or the certificate. When battery authenticator 202 does not include the security chip, for example, charging station 20 may include the security chip. Battery authenticator 202 that does not include the security chip holds an encryption key or a certificate that is encrypted. Battery authenticator 202 may decode the encryption key or the certificate that is encrypted within the security chip of charging station 20 so as to perform the authentication with the encryption key or the certificate that is decoded.

When the authentication of the secondary battery succeeds and charging is completed, battery authenticator 202 notifies server 30 of the charge count. Battery authenticator 202 may use, for example, TLS to perform mutual authentication with electric energy storage device 120 that is connected for the charging.

Communicator 205 is connected to electric energy storage device 120 connected for the charging to communicate with electric energy storage device 120, and thereby obtains, from electric energy storage device 120, battery information on electric energy storage device 120. The battery information includes at least one of the battery ID or the degree of deterioration. When the validity of electric energy storage device 120 connected for the charging is confirmed by battery authenticator 202, communicator 205 may obtain the degree of deterioration on deterioration of electric energy storage device 120 from electric energy storage device 120 whose validity is confirmed. Communicator 205 is an example of an obtainer.

Controller 203 controls the charging of electric energy storage device 120 that is stored in charging station 20 and that is connected for the charging. When the authentication of the user by user authenticator 201 succeeds and the authentication of electric energy storage device 120 by battery authenticator 202 succeeds, that is, when the user is an authorized user and electric energy storage device 120 is an authorized electric energy storage device 120, controller 203 determines the degree of deterioration of electric energy storage device 120. When the authentication of the user by user authenticator 201 fails and the authentication of electric energy storage device 120 by battery authenticator 202 fails, that is, when the user is an unauthorized user or electric energy storage device 120 is unauthorized electric energy storage device 120, controller 203 does not charge electric energy storage device 120. In other words, in this case, controller 203 prohibits the charging of electric energy storage device 120.

Controller 203 determines the degree of deterioration of electric energy storage device 120. Specifically, controller 203 determines whether or not deterioration with the degree of deterioration of electric energy storage device 120 is advanced beyond a predetermined threshold value. Then, when the degree of deterioration of electric energy storage device 120 indicates that the deterioration is advanced beyond the predetermined threshold value, controller 203 does not charge electric energy storage device 120. In other words, in this case, controller 203 prohibits the charging of electric energy storage device 120. When the degree of deterioration of electric energy storage device 120 does not indicate that the deterioration is advanced beyond the predetermined threshold value, controller 203 charges electric energy storage device 120. In other words, controller 203 does not charge electric energy storage device 120 in which its deterioration is advanced beyond the predetermined degree of deterioration, and charges electric energy storage device 120 in which its deterioration is not advanced beyond the predetermined degree of deterioration.

In the determination of the degree of deterioration, when the degree of deterioration is the charge count, controller 203 determines whether or not the charge count is greater than a predetermined charge count that serves as the predetermined threshold value. When the charge count is greater than the predetermined charge count, controller 203 determines that deterioration with the degree of deterioration of electric energy storage device 120 is advanced beyond the predetermined degree of deterioration whereas when the charge count is equal to or less than the predetermined charge count, controller 203 determines that deterioration with the degree of deterioration of electric energy storage device 120 is not advanced beyond the predetermined degree of deterioration.

In the determination of the degree of deterioration, when the degree of deterioration is the charge amount, controller 203 determines whether or not the charge amount is greater than a predetermined charge amount that serves as the predetermined threshold value. When the charge amount is greater than the predetermined charge amount, controller 203 determines that deterioration with the degree of deterioration of electric energy storage device 120 is advanced beyond the predetermined degree of deterioration whereas when the charge amount is equal to or less than the predetermined charge amount, controller 203 determines that deterioration with the degree of deterioration of electric energy storage device 120 is not advanced beyond the predetermined degree of deterioration.

In the determination of the degree of deterioration, when the degree of deterioration is the SOH, controller 203 determines whether or not the SOH is less than a predetermined SOH that serves as the predetermined threshold value. When the SOH is less than the predetermined SOH, controller 203 determines that deterioration with the degree of deterioration of electric energy storage device 120 is advanced beyond the predetermined degree of deterioration whereas when the SOH is equal to or less than the predetermined SOH, controller 203 determines that deterioration with the degree of deterioration of electric energy storage device 120 is not advanced beyond the predetermined degree of deterioration.

Controller 203 may transmit the battery ID of electric energy storage device 120 whose validity is not confirmed in mutual authentication, that is, the battery ID of unauthorized electric energy storage device 120 to server 30 through communicator 205. When the degree of deterioration of electric energy storage device 120 indicates that the deterioration is advanced beyond the predetermined threshold value, controller 203 may transmit the battery ID of electric energy storage device 120 to server 30 through communicator 205.

Recorder 204 stores the battery ID of electric energy storage device 120 connected for charging to charging station 20. Recorder 204 stores the battery IDs of all electric energy storage devices 120 connected for charging, and each time electric energy storage device 120 is connected, recorder 204 stores the battery ID of electric energy storage device 120 connected. Recorder 204 may store the battery ID and a date and time when electric energy storage device 120 having the battery ID is connected to the charging station such that the battery ID and the date and time are associated with each other. In order to distinguish between the battery ID of unauthorized electric energy storage device 120 and the battery ID of authorized electric energy storage device 120, recorder 204 may further store identifiers for indicating whether electric energy storage device 120 is unauthorized or authorized. In this way, recorder 204 manages the battery ID of unauthorized electric energy storage device 120 and the battery ID of authorized electric energy storage device 120. Recorder 204 may be a tamper-resistant security chip (memory).

Recorder 204 may store the degree of deterioration of electric energy storage device 120 obtained from electric energy storage device 120. When recorder 204 obtains, from server 30, the degree of deterioration corresponding to the battery ID of electric energy storage device 120 connected to charging station 20, recorder 204 stores the battery ID and the degree of deterioration obtained such that the battery ID and the degree of deterioration are associated with each other.

[1.4 Configuration of Server]

Figure 6:
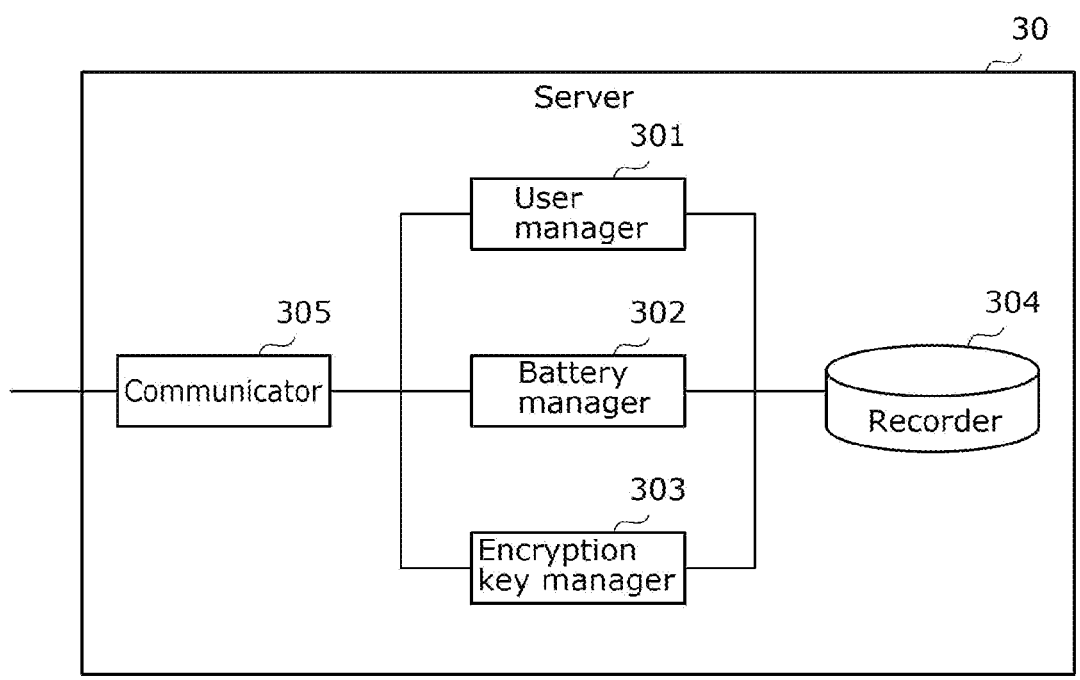
FIG. 6 is a block diagram illustrating an example of the configuration of a server in the embodiment.

FIG. 6 is a block diagram illustrating an example of the configuration of the server in the embodiment.

Server 30 includes user manager 301, battery manager 302, encryption key manager 303, recorder 304, and communicator 305. Server 30 is an example of a management device.

User manager 301 manages user information of the user who is a target to which service is provided. User manager 301 makes the user register the user information when the utilization of the service is started to previously obtain the user information from the user, and uses the user information obtained for authentication. For example, as described above, the user information managed by user manager 301 may be the ID and password of the user, the information of the membership card owned by the user, biometric information such as the amount of characteristic of a face image used for face authentication or the amount of characteristic of an iris image used for iris authentication, or the like.

Battery manager 302 manages electric energy storage devices 120. Battery manager 302 stores the battery IDs of a plurality of electric energy storage devices 120 that are shipped. For example, when battery manager 302 detects a plurality of same battery IDs obtained with communicator 305 for electric energy storage device 120 connected to charging station 20, battery manager 302 may detect, as an unauthorized battery ID, the battery ID of electric energy storage device 120 of the same battery IDs. Battery manager 302 stores, in recorder 304, as the unauthorized battery ID, the unauthorized battery ID that is detected. For example, battery manager 302 updates identification information stored in recorder 304 and associated with the battery ID from the identification information indicating that the battery ID is authorized to the identification information indicating that the battery ID is unauthorized. Battery manager 302 updates the identification information associated with the unauthorized battery ID obtained with communicator 305 from charging station 20 and the same battery ID in recorder 304 from the identification information indicating that the battery ID is authorized to the identification information indicating that the battery ID is unauthorized.

Encryption key manager 303 manages the encryption keys stored in electric vehicle 10, electric energy storage devices 120, and charging station 20. For example, encryption key manager 303 stores, in recorder 304, the IDs of electric vehicle 10, electric energy storage devices 120, and charging station 20 and the encryption keys associated with these IDs such that the IDs and the encryption keys are associated with each other. Encryption key manager 303 issues or invalidates the encryption keys to manage the encryption keys. Specifically, encryption key manager 303 stores the encryption keys in recorder 304 such that the encryption keys are associated with identification information indicating whether the encryption keys are valid or invalid, and thereby manages the encryption keys. The encryption keys may be issued by a third party organization or may be issued by server 30. The encryption keys issued are sent to the maker of the electric vehicle, the makers of the secondary batteries, and charging station 20, and are stored in electric vehicle 10, electric energy storage devices 120, and charging station 20.

Recorder 304 stores the battery IDs of electric energy storage devices 120 and the encryption keys or certificates issued to electric energy storage devices 120. Recorder 304 also stores the vehicle ID of electric vehicle 10 and the encryption key or certificate issued to electric vehicle 10. Recorder 304 also stores the station ID of charging station 20 and the encryption key or certificate issued to charging station 20.

[1.5 Configuration of Charging Facility]

Charging facility 40 charges electric energy storage device 120 removed from electric vehicle 10, and charges, through a charging device attached to electric vehicle 10, electric energy storage device 120 fitted to electric vehicle 10. Here, electric energy storage device 120 may record, in recorder 1104, the degree of deterioration or the information of charging facility 40 that charges electric energy storage device 120. The information of charging facility 40 may include a place where charging facility 40 is installed, a date and time when electric energy storage device 120 is charged, a charging time taken for the charging of electric energy storage device 120, information indicating whether the charging of electric energy storage device 120 is fast charging or slow charging, and the like. When electric vehicle 10 or electric energy storage device 120 can obtain positional information indicating the position of electric vehicle 10 or electric energy storage device 120, electric energy storage device 120 may store, as the information of charging facility 40, the positional information of electric vehicle 10 or the electric energy storage device at the time of charging. When charging facility 40 determines that abnormal charging is performed on electric energy storage device 120, charging facility 40 may stop the charging to electric energy storage device 120. The abnormal charging may be, for example, charging using a voltage higher than a predetermined voltage, charging using a current higher than a predetermined current or charging at a temperature lower than a predetermined temperature (atmospheric temperature).

[1.6 Sequence at Time of Charging]

A sequence at the time of charging between electric energy storage device 120, charging station 20, and server 30 will be described below.

Figure 7:
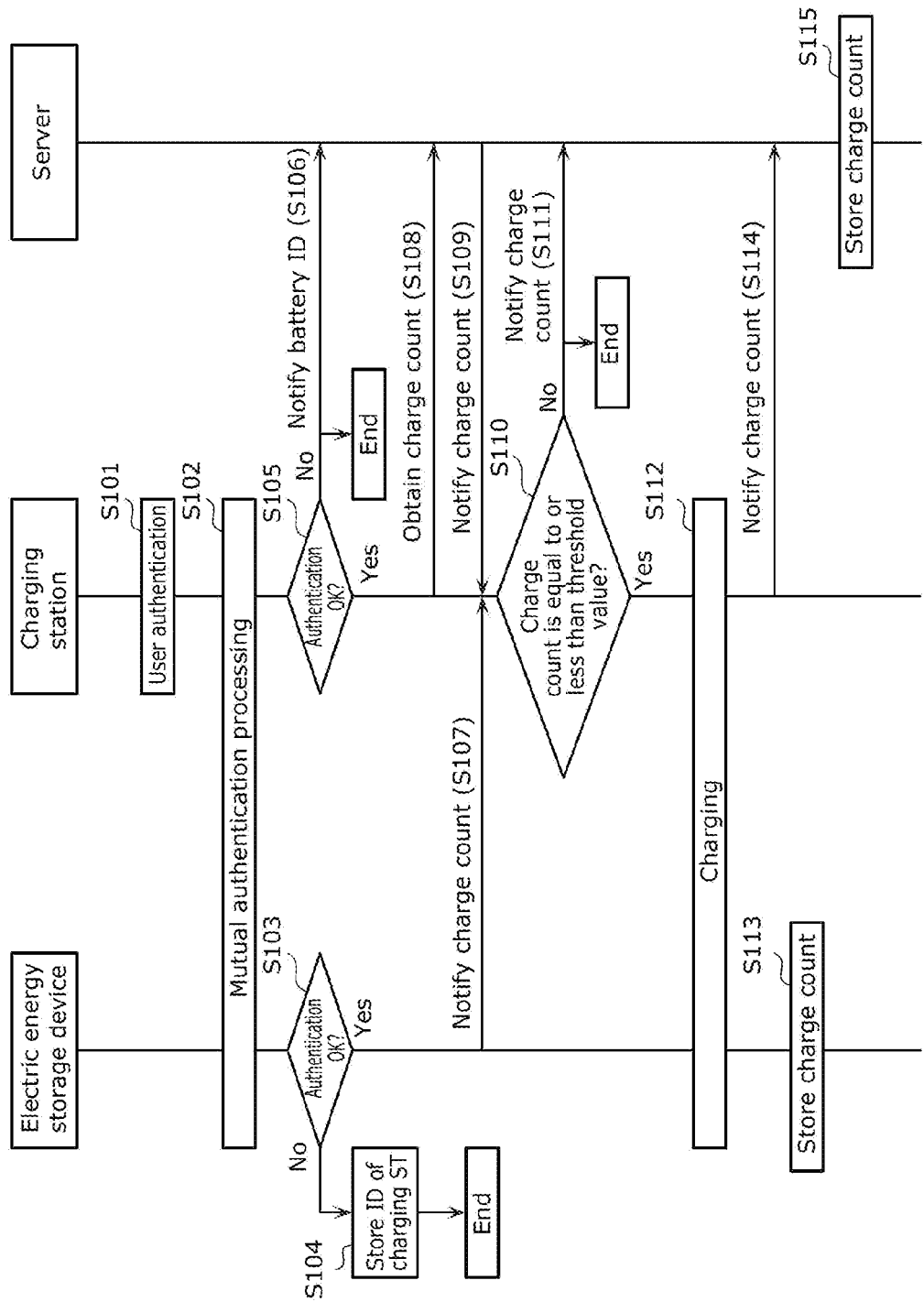
FIG. 7 is a sequence diagram illustrating an example of charging processing in the embodiment.

FIG. 7 is a sequence diagram illustrating an example of charging processing in the embodiment.

(Step S101) Charging station 20 authenticates a user who comes to replace electric energy storage device 120. When charging station 20 determines that the user is an authorized user, charging station 20 unlocks the door of a charging space where electric energy storage devices 120 that have already been charged in charging station 20 are placed so as to allow the door to be opened. In this way, the user can exchange electric energy storage device 120 that is placed in the charging space having the door unlocked and that has already been charged for electric energy storage device 120 utilized in electric vehicle 10.

(Step S102) When the user stores, in charging station 20, electric energy storage device 120 utilized in electric vehicle 10, charging station 20 and electric energy storage device 120 perform mutual authentication processing between electric energy storage device 120 that is newly placed in the charging space and charging station 20.

(Step S103) Electric energy storage device 120 determines whether or not the authentication with charging station 20 succeeds.

(Step S104) When the authentication with charging station 20 does not succeed (No in S103), electric energy storage device 120 stores the station ID of charging station 20 in which the authentication does not succeed, and completes this processing without performing charging.

(Step S105) Charging station 20 determines whether or not the authentication with electric energy storage device 120 succeeds.

(Step S106) When the authentication with electric energy storage device 120 does not succeed (No in S105), charging station 20 transmits, to server 30, the battery ID of electric energy storage device 120 in which the authentication does not succeed, and completes this processing without charging electric energy storage device 120.

(Step S107) When the authentication with charging station 20 succeeds (Yes in S103), electric energy storage device 120 notifies charging station 20 of the degree of deterioration stored in recorder 1204. Here, an example where the charge count is notified as the degree of deterioration will be described. In other words, in the following description, the charge count can be replaced with the degree of deterioration or can be replaced with an example of the degree of deterioration other than the charge count.

(Step S108) When the authentication with electric energy storage device 120 succeeds (Yes in S105), charging station 20 may inquire of server 30 as to the charge count based on the battery ID of electric energy storage device 120 so as to obtain the charge count.

(Step S109) When server 30 obtains the battery ID from charging station 20, server 30 notifies the charge count of corresponding electric energy storage device 120.

(Step S110) Charging station 20 verifies, from the charge count that is obtained, whether there is a contradiction in the charge count or whether the charge count is equal to or less than a threshold value (Step S111) When the charge count exceeds the threshold value (No in S110), charging station 20 notifies server 30 of the battery ID, and completes this processing without charging electric energy storage device 120.

(Step S112) When the charge count is equal to or less than the threshold value (Yes in S110), charging station 20 starts the charging of electric energy storage device 120.

(Step S113) After completion of the charging of electric energy storage device 120, electric energy storage device 120 updates the charge count of electric energy storage device 120 that is stored in recorder 1204 to a new charge count that is obtained by incrementing the charge count of electric energy storage device 120 by one.

(Step S114) After completion of the charging of electric energy storage device 120, charging station 20 updates the charge count of electric energy storage device 120 that is obtained from electric energy storage device 120 to a new charge count that is obtained by incrementing the charge count of electric energy storage device 120 by one, and transmits the new charge count to server 30.

(Step S115) When server 30 obtains, from charging station 20, the new charge count of electric energy storage device 120, server 30 stores the charge count of electric energy storage device 120 that is obtained. Server 30 may update the charge count that is stored to be associated with the battery ID of electric energy storage device 120 to the charge count that is newly obtained.

Either of step S107 and steps S108 and S109 may be omitted.

[1.7 Authentication Sequence of Secondary Battery and Vehicle Manager]

A sequence of authentication processing between electric energy storage device 120, electric vehicle 10, and server 30 will be described below.

Figure 8:
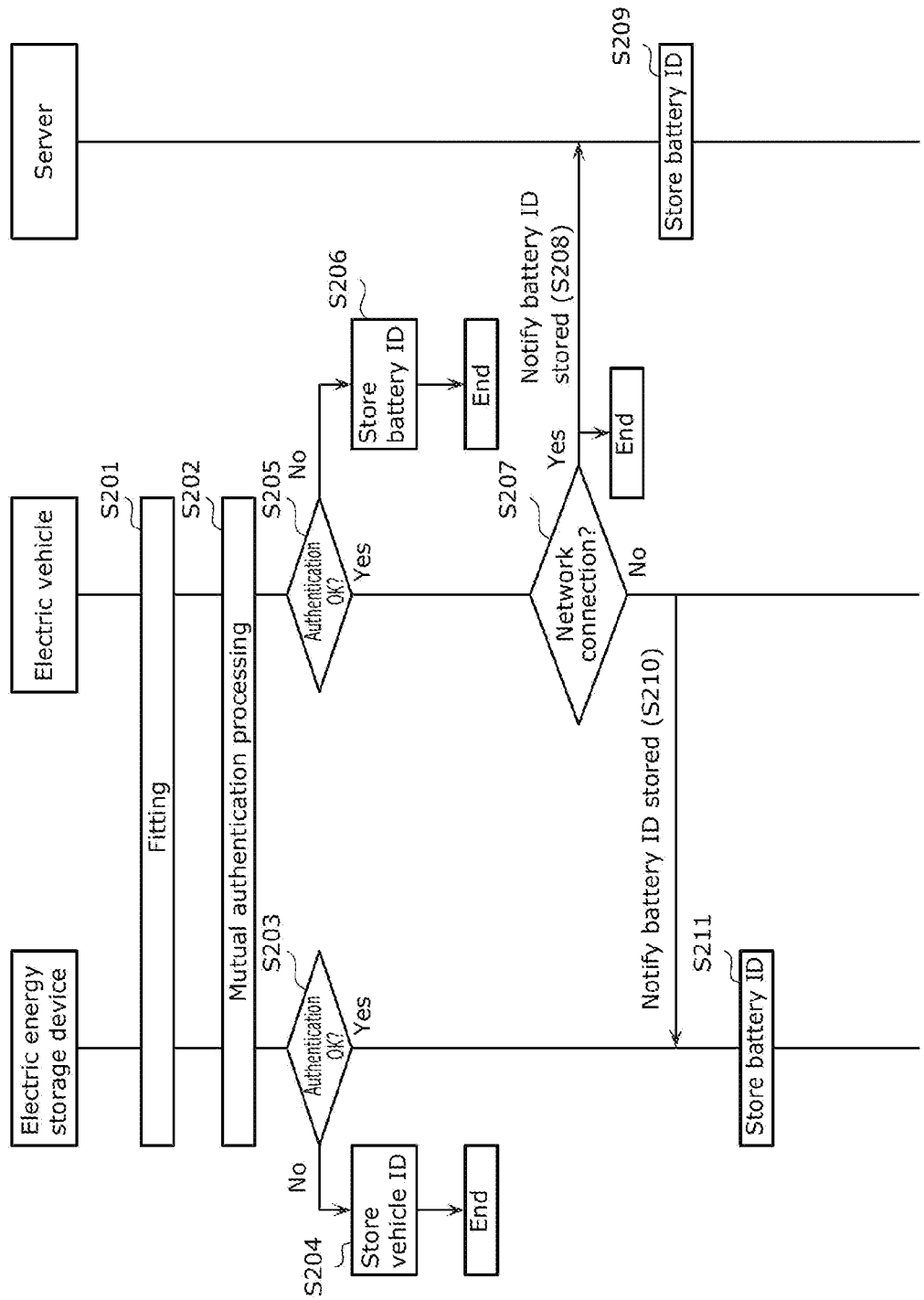
FIG. 8 is a sequence diagram illustrating an example of authentication processing between the electric energy storage device and the electric vehicle in the embodiment.

FIG. 8 is a sequence diagram illustrating an example of the authentication processing between the electric energy storage device and the electric vehicle in the embodiment.

(Step S201) Electric energy storage device 120 and electric vehicle 10 detect that electric energy storage device 120 is fitted to connector 140 of electric vehicle 10. Electric energy storage device 120 may detect the supply of power to electric vehicle 10 to detect that electric energy storage device 120 is connected to connector 140 of the electric vehicle. Electric vehicle 10 may detect the supply of power from electric energy storage device 120 to detect that electric energy storage device 120 is connected to connector 140 of the electric vehicle.

(Step S202) Electric energy storage device 120 and electric vehicle 10 perform mutual authentication.

(Step S203) Electric energy storage device 120 determines whether or not the authentication with electric vehicle 10 succeeds.

(Step S204) When the authentication with electric vehicle 10 does not succeed (No in S203), electric energy storage device 120 determines that electric vehicle 10 in which the authentication does not succeed is an unauthorized electric vehicle, stores the vehicle ID of electric vehicle 10, and completes this processing without allowing discharging to the side of electric vehicle 10.

(Step S205) Electric vehicle 10 determines whether or not the authentication with electric energy storage device 120 succeeds.

(Step S206) When the authentication with electric energy storage device 120 does not succeed (No in S205), electric vehicle 10 determines that electric energy storage device 120 fitted is an unauthorized electric energy storage device, stores the battery ID of electric energy storage device 120, and completes this processing without starting up electric vehicle 10.

(Step S207) When the authentication with electric energy storage device 120 succeeds (Yes in S205), electric vehicle 10 determines whether or not electric vehicle 10 is connected to communication network 50. In other words, electric vehicle 10 determines whether or not electric vehicle 10 has a network connection.

(Step S208) When electric vehicle 10 determines that electric vehicle 10 is connected to communication network 50 (Yes in S207), electric vehicle 10 transmits the unauthorized battery ID stored in electric vehicle 10 to server 30.

(Step S209) When server 30 obtains the battery ID from electric vehicle 10, server 30 stores the battery ID obtained.

(Step S210) When electric vehicle 10 determines that electric vehicle 10 is not connected to communication network 50 (No in S207), electric vehicle 10 transmits, to electric energy storage device 120 in which the authentication succeeds, the unauthorized battery ID already stored in electric vehicle 10.

(Step S211) When the authentication with electric vehicle 10 succeeds (Yes in S203) and electric energy storage device 120 receives the unauthorized battery ID from electric vehicle 10, electric energy storage device 120 stores the unauthorized battery ID received.

[1.8 Battery ID Notification Sequence]

A sequence of notification processing of the battery ID between electric energy storage device 120, charging station 20, and server 30 will be described below.

FIG. 9 is a sequence illustrating an example of the notification processing of the battery ID in the embodiment.

(Step S301) Since charging processing between electric energy storage device 120 and charging station 20 is the same as the charging processing from step S101 to step S115, the description here will be omitted. Processing that is performed when the authentication processing between electric energy storage device 120 and charging station 20 succeeds will be described below.

(Step S302) Electric energy storage device 120 determines whether or not electric energy storage device 120 stores an unauthorized battery ID. When electric energy storage device 120 does not store an unauthorized battery ID (No in S302), electric energy storage device 120 completes the notification processing.

(Step S303) When electric energy storage device 120 stores an unauthorized battery ID (Yes in S302), electric energy storage device 120 transmits the unauthorized battery ID stored to charging station 20.

(Step S304) When charging station 20 obtains the unauthorized battery ID from electric energy storage device 120, charging station 20 transmits the battery ID obtained to server 30.

(Step S305) When server 30 obtains the unauthorized battery ID from charging station 20, server 30 stores the unauthorized battery ID.

[1.9 Effects of Embodiment]

In the embodiment, the mutual authentication is performed between electric energy storage device 120 and charging station 20, the mutual authentication is performed between electric energy storage device 120 and electric vehicle 10, and thus it is possible to eliminate unauthorized batteries. Furthermore, in electric energy storage device 120 or charging station 20, the charge count of the electric energy storage device is recorded, and thus it is possible to detect whether or not electric energy storage device 120 deteriorates. The charge count is recorded in the security chip, and thus the charge count is prevented from being tampered, with the result that the charge count can be assured. When unauthorized electric energy storage device 120 is detected, the unauthorized battery ID is transmitted to server 30 through an authorized battery without electric vehicle 10 being connected to communication network 50, and thus it is possible to eliminate unauthorized electric energy storage devices.

In the embodiment, when the charging station obtains, from an electric energy storage device whose validity is confirmed by performing the mutual authentication, the degree of deterioration of the electric energy storage device stored in a tamper-resistant first memory, and the degree of deterioration indicates that the deterioration is advanced beyond the predetermined threshold value, the charging station does not charge the electric energy storage device. Thus, by using the degree of deterioration that is not tampered, it is possible to appropriately determine whether or not the electric energy storage device is charged. Therefore, it is possible to suppress the utilization and distribution of deteriorated electric energy storage devices. In this way, the amount of power available in the electric energy storage device can be kept equal to or greater than a given amount.

[2. Other Variations]

Although the present disclosure has been described based on the embodiment described above, the present disclosure is naturally not limited to the embodiment described above. Cases as described below are also included in the present disclosure.

(1) Although in the embodiment described above, electric vehicle 10 stores the battery ID in step S206, electric vehicle 10 may make the same determination as in step S207 when storing the battery ID. As a result of the determination in this case, when the determination is yes, step S208 may be performed whereas when the determination is no, the processing may be completed.

(2) Although in the embodiment described above, electric energy storage device 120 notifies charging station 20 of the charge count, the charge/discharge history of electric energy storage device 120 or sensor information obtained in electric vehicle 10 may be recorded and transmitted. The sensor information obtained in electric vehicle 10 may be transmitted and received between electric energy storage device 120 and electric vehicle 10 when the mutual authentication is performed between electric energy storage device 120 and electric vehicle 10. Charging station 20 may transmit the information obtained from electric energy storage device 120 to server 30.

(3) Although in the embodiment described above, electric vehicle 10 and electric energy storage device 120 perform the mutual authentication, when electric vehicle 10 is connected to communication network 50, electric vehicle 10 may inquire of server 30 as to whether or not electric energy storage device 120 is unauthorized or deteriorates.

(4) Although in the embodiment described above, electric vehicle 10 and electric energy storage device 120 perform the mutual authentication when electric energy storage device 120 is fitted, this mutual authentication may be performed when electric vehicle 10 is started up. This mutual authentication may also be performed when electric vehicle 10 is charged in charging facility 40.

(5) Although in the embodiment described above, electric vehicle 10 and electric energy storage device 120 perform the mutual authentication, when the authentication does not succeed, power from electric energy storage device 120 does not need to be supplied to electric vehicle 10.

(6) In the embodiment described above, as the battery ID, the station ID of charging station 20 and the vehicle ID of electric vehicle 10, an ID described in the certificate of the encryption key may be used.

(7) In the embodiment described above, electric vehicle 10 may authenticate the user who operates electric vehicle 10. Here, electric vehicle 10 may obtain user information from server 30 or may transmit user information to server 30, make server 30 authenticate the user, and obtain the result of the authentication from server 30.

(8) Although in the embodiment described above, server 30 manages the issue and invalidation of the encryption key or the certificate, a third party organization may issue the encryption key or the certificate.

(9) Although in the embodiment described above, charging station 20 obtains the charge count of electric energy storage device 120 from electric energy storage device 120 and server 30, when a difference between the charge count that is obtained from server 30 and the charge count that is obtained from electric energy storage device 120 or a difference between the amounts of charging is equal to or greater than a threshold value, it may be determined that electric energy storage device 120 is charged in an unauthorized manner. The threshold value may be equal to or greater than 1.

Specifically, after the determination is yes in step S105, charging station 20 obtains the charge count from electric energy storage device 120 and the charge count of electric energy storage device 120 from server 30. Charging station 20 may further determine whether or not the charge count that is obtained from electric energy storage device 120 is equal to the charge count of electric energy storage device 120 that is obtained from server 30. When the charge count that is obtained from electric energy storage device 120 is not equal to the charge count of electric energy storage device 120 that is obtained from server 30, charging station 20 may make a determination that electric energy storage device 120 is not charged. Then, when the charge count that is obtained from electric energy storage device 120 is not equal to the charge count of electric energy storage device 120 that is obtained from server 30, charging station 20 may determine that electric energy storage device 120 is an unauthorized battery and notify the battery ID of electric energy storage device 120 as the unauthorized battery ID to server 30. Server 30 may store, as the unauthorized battery ID, the battery ID notified. When the charge count that is obtained from electric energy storage device 120 is equal to the charge count of electric energy storage device 120 that is obtained from server 30, charging station 20 charges electric energy storage device 120.

In order that as described above, the condition where electric energy storage device 120 is charged is that the charge count which is stored in electric energy storage device 120 is equal to the charge count which is stored in server 30, each time electric energy storage device 120 is charged, information indicating the charge count of electric energy storage device 120 or the completion of the charging needs to be notified to server 30. Hence, when electric energy storage device 120 is separately connected to communication network 50, each time charging from electric energy storage device 120 is performed, the charge count may be notified to server 30.

When charging facility 40 is connected to communication network 50, charging facility 40 notifies server 30 of information indicating that electric energy storage device 120 is charged, and server 30 updates the charge count of electric energy storage device 120 that is stored. Specifically, server 30 increments the charge count of electric energy storage device 120 that is stored by one.

Charging facility 40 may obtain the charge count from electric energy storage device 120 and notify server 30 of a new charge count obtained, after the charging, by incrementing the charge count by one. The server updates the charge count of electric energy storage device 120 that is stored to the new charge count that is notified.

(10) Electric vehicles 10 may be classified into a plurality of classes according to the amount of power consumed per unit time (that is, power consumption). The vehicle IDs of electric vehicles 10 may be associated with a plurality of classes corresponding to power consumption. For example, when electric vehicles 10 are classified into class A in which power consumption is low, class B in which power consumption is medium, and class C in which power consumption is high, vehicle IDs may be associated with pieces of class information each of which indicates any one of classes A to C.

Furthermore, electric energy storage device 120 stores the vehicle ID or class information of electric vehicle 10 that is fitted, and transmits, through charging station 20, the vehicle ID or class information of electric vehicle 10 fitted to server 30. When in step S108, charging station 20 obtains, from server 30, the charge count of electric energy storage device 120 connected, charging station 20 may obtain, together with the charge count, vehicle IDs or pieces of class information of electric vehicles 10 to which electric energy storage device 120 has been fitted so as to correct the charge count according to pieces of class information determined from the vehicle IDs obtained or the pieces of class information obtained. For example, as the number of times charging station 20 is connected to class C is larger, charging station 20 may correct the charge count such that its deterioration is advanced whereas as the number of times charging station 20 is connected to class A is larger, charging station 20 may correct the charge count such that its deterioration is not advanced.

In addition to the correction of the charge count, charging station 20 may use the class information in order to calculate the degree of deterioration. Specifically, for example, as the number of times charging station 20 is connected to class C is larger, charging station 20 may calculate the degree of deterioration which has such a value that the deterioration is advanced whereas as the number of times charging station 20 is connected to class A is larger, charging station 20 may calculate the degree of deterioration which has such a value that the deterioration is not advanced.

(11) Each device in the embodiment described above is specifically a computer system formed with a microprocessor, a ROM, a RAM, a hard disk unit, a display unit, a keyboard, a mouse, and the like. In the RAM or the hard disk unit, computer programs are recorded. The microprocessor is operated according to the computer programs, and thus each device achieves its function. Here, the computer programs are formed by combining a plurality of command codes for providing an instruction to a computer in order to achieve a predetermined function.

(12) In each device of the embodiment described above, part or the whole of constituent elements may be formed with one system LSI (Large Scale Integration) circuit. The system LSI circuit is an ultra-multifunctional LSI circuit manufactured by integrating a plurality of components on a single chip, and is specifically a computer system including a microprocessor, a ROM, a RAM, and the like. Computer programs are recorded in the RAM. The microprocessor is operated according to the computer programs, and thus the system LSI circuit achieves its function.

Constituent elements of each device described above may be individually formed into single chips, or part or all of the constituent elements may be collectively formed into one chip.

Although system LSI circuit is described here, the circuit may be referred to as an IC, an LSI circuit, a super-LSI circuit or an ultra-LSI circuit depending on the degree of integration. The method for forming the integrated circuit is not limited to LSI; the integrated circuit may be realized with a dedicated circuit or a general-purpose processor. An FPGA (Field Programmable Gate Array) that can be programed after the manufacturing of an LSI circuit or a configurable processor that allows the connection and setting of circuit cells within an LSI circuit to be reconfigured may be utilized.

When a circuit integration technology that replaces LSI is developed due to advances in semiconductor technology or another derivative technology, such a technology may naturally be used to integrate a functional block. For example, application of a biotechnology is conceivable.

(13) Part or the whole of the constituent elements of each device described above may be formed with an IC card or a single module that is detachable with respect to each device. The IC card or the module is a computer system formed with a microprocessor, a ROM, a RAM, and the like. The IC card or the module may include the ultra-multifunctional LSI circuit described above. The microprocessor is operated according to computer programs, and thus the IC card or the module achieves its function. The IC card or the module may be tamper-resistant.

(14) The present disclosure may be the methods described above. The present disclosure may be computer programs that realize these methods with a computer or may be digital signals formed with computer programs.

The present disclosure may be a computer-readable recording medium, such as a flexible disk, a hard disk, a CD-ROM, an MO, a DVD, a DVD-ROM, a DVD-RAM, a BD (Blu-ray (registered trademark) Disc), or a semiconductor memory, in which computer programs or digital signals are recorded. The present disclosure may be the digital signals recorded in these recording media.

The present disclosure may be computer programs or digital signals that are transmitted through a telecommunication line, a wireless or wired communication line, a network represented by the Internet, data broadcasting, or the like.

The present disclosure may be a computer system that includes a microprocessor and a memory, the memory may record the computer programs described above, and the microprocessor may be operated according to the computer programs.

The present disclosure may be programs or digital signals that are recorded in a recording medium and transferred or that are transferred through a network or the like so as to be executed with another independent computer system.

(14) The embodiment described above and the variations described above may be combined individually.

INDISTRIAL APPLICABILITY

In the present disclosure, in a battery management system, an encryption key and the charge count are recorded in a security chip, and thus unauthorized batteries can be eliminated, and batteries that have a large charge count can also be eliminated.

The invention claimed is:

1. A charging station that charges an electric energy storage device, the charging station comprising:
   a processor;
   at least one memory including a program that, when executed by the processor, causes the processor to perform functions, the functions comprising:
      performing mutual authentication with the electric energy storage device, when connected for charging;
      obtaining, from the electric energy storage device whose validity is confirmed in the mutual authentication, a degree of deterioration related to deterioration of the electric energy storage device;
      storing, in the at least one memory, the degree of deterioration, the at least one memory comprising a security chip; and
      forgoing charging of the electric energy storage device when the degree of deterioration of the electric energy storage device stored in the at least one memory indicates that the degree of deterioration is advanced beyond a predetermined threshold value.

2. The charging station according to claim 1, wherein the processor charges the electric energy storage device when the degree of deterioration of the electric energy storage device indicates that the degree of deterioration is equal to or less than the predetermined threshold value.

3. The charging station according to claim 1, wherein the degree of deterioration is at least one of a charge count, a charge amount, or a state of health (SOH).

4. The charging station according to claim 1, wherein the processor further obtains an identifier of the electric energy storage device, and
the processor transmits the identifier of the electric energy storage device to a management device when the degree of deterioration of the electric energy storage device indicates that the degree of deterioration is advanced beyond the predetermined threshold value.

5. The charging station according to claim 1, wherein the processor further obtains an identifier of the electric energy storage device, and
the processor transmits, to a management device, the identifier of the electric energy storage device in response to the mutual authentication being unsuccessful.

6. The charging station according to claim 1, wherein the degree of deterioration is a charge count, and
when the electric energy storage device is charged, the processor increments a charge count of the electric energy storage device stored in the at least one memory by one to obtain a new charge count, and transmits the new charge count to a management device.

7. The charging station according to claim 1, wherein the security chip is tamper-resistant for preventing information for the mutual authentication from being tampered with or leaking.

8. A battery management system comprising:
   an electric energy storage device; and
   a charging station,
   wherein the electric energy storage device includes:
      a first authenticator that performs mutual authentication with the charging station, when connected for charging;
      a first memory, comprising a first security chip, that stores a degree of deterioration related to deterioration of the electric energy storage device; and
      a transmitter that transmits the degree of deterioration stored in the first security chip to the charging station, and
   the charging station includes:
      a second authenticator that performs the mutual authentication with the electric energy storage device, when connected for charging;
      a second obtainer that obtains, from the electric energy storage device whose validity is confirmed in the mutual authentication, the degree of deterioration related to the deterioration of the electric energy storage device;

a second memory, comprising a second security chip, that stores the degree of deterioration obtained by the second obtainer; and a controller that forgoes charging the electric energy storage device when the degree of deterioration of the electric energy storage device stored in the second security chip indicates that the degree of deterioration is advanced beyond a predetermined threshold value.

9. The battery management system according to claim 8, wherein the first authenticator further performs mutual authentication with an electric vehicle to which the electric energy storage device is connected, the electric energy storage device further includes a first obtainer that obtains, from the electric vehicle, an identifier of another electric energy storage device different from the electric energy storage device, the first security chip stores the identifier of the another electric energy storage device obtained from the first obtainer, and the transmitter transmits the identifier of the another electric energy storage device stored in the first security chip to the charging station connected for the charging.

10. A charging method performed by a charging station that charges an electric energy storage device, the charging method comprising:

performing, by a processor of the charging station, mutual authentication with the electric energy storage device connected to the charging station for charging;

obtaining, by the processor and from the electric energy storage device whose validity is confirmed in the mutual authentication, a degree of deterioration related to deterioration of the electric energy storage device;

storing, by the processor, the degree of deterioration obtained in a memory that is included in the charging station and that comprises a security chip; and forgoing, by the processor, charging of the electric energy storage device when the degree of deterioration of the electric energy storage device stored in the security chip indicates that the degree of deterioration is advanced beyond a predetermined threshold value.

11. The battery management system according to claim 8, wherein the first security chip and the second security chip are each tamper-resistant for preventing information for the mutual authentication from being tampered with or leaking.

* * * * *